May 23, 1967  F. L. ANDRAE  3,320,809
LINEAR SERVO ABSOLUTE TRANSDUCER
Filed Nov. 14, 1962  5 Sheets-Sheet 1

PRIOR ART

INVENTOR:
FRITZ L. ANDRAE,
BY
Attorney.

Fig.3.

INVENTOR:
FRITZ L. ANDRAE,
BY [signature]
Attorney.

May 23, 1967   F. L. ANDRAE   3,320,809
LINEAR SERVO ABSOLUTE TRANSDUCER
Filed Nov. 14, 1962   5 Sheets-Sheet 3

INVENTOR:
FRITZ L. ANDRAE,
BY *Donald R. Nyhagen*

Attorney.

May 23, 1967 F. L. ANDRAE 3,320,809
LINEAR SERVO ABSOLUTE TRANSDUCER
Filed Nov. 14, 1962 5 Sheets-Sheet 4

INVENTOR:
FRITZ L. ANDRAE,
BY
Attorney.

May 23, 1967          F. L. ANDRAE          3,320,809

LINEAR SERVO ABSOLUTE TRANSDUCER

Filed Nov. 14, 1962          5 Sheets-Sheet 5

INVENTOR:
FRITZ L. ANDRAE,

BY

*Attorney.*

United States Patent Office 3,320,809
Patented May 23, 1967

3,320,809
LINEAR SERVO ABSOLUTE TRANSDUCER
Fritz L. Andrae, Torrance, Calif., assignor to The Garrett Corporation, Los Angeles, Calif., a corporation of California
Filed Nov. 14, 1962, Ser. No. 237,565
13 Claims. (Cl. 73—407)

This invention relates generally to force monitoring or measuring instruments and particularly to improvements in force balance transducers.

Force-balance transducers are well known in the art and are commonly used to monitor or measure forces or force relationships, such as fluid pressures, fluid pressure ratios and fluid pressure differentials. The typical force-balance transducer is equipped with a balance beam, a fulcrum to pivotally support the beam, means to exert the force or forces to be monitored on the beam, and a mechanism to balance the beam either by shifting the beam fulcrum or regulating one of the forces acting on the beam. The output of the transducer is commonly taken, in the form of a mechanical output motion, from one element of the balancing mechanism. This output motion may be used directly to operate a suitably calibrated readout device or other device or it may be converted to an electrical, pneumatic, or hydraulic output signal for operating a readout or other device.

Depending upon the particular application of the transducer, it may be desirable to have the transducer output vary according to a predetermined linear or non-linear function of the force or forces being monitored.

A general object of the present invention is to provide an improved force-balance transducer having unique features of construction and operation, whereby certain desirable output functions of the monitored force or forces are attained.

A primary aspect of the invention is concerned with improvements in force-balance transducers of the kind in which a force to be monitored acts on the transducer beam in opposition to a spring force and the beam is balanced by rotating a jackscrew to shift the fulcrum along the beam. The output of the transducer is commonly taken from a speed reducer driven by the jackscrew or from the jackscrew itself. Thus, the angular position of the rotary output element of the transducer is linearly related to the position of the fulcrum along the beam and this fulcrum position is, in turn, related to the magnitude of the monitored force when the beam is balanced in its neutral position. The angular position of the output element is, therefore, related to the magnitude of the monitored force.

In the existing transducers of this kind, the relationship between the position of the fulcrum and the magnitude of the monitored force, and hence the transducer output, are non-linear; that is to say, the distance through which the fulcrum must be shifted to maintain the transducer beam in balance during a given change in the monitored force varies non-linearly with the magnitude of the monitored force (or the fulcrum position along the beam). This non-linearity is due to the fact that the moment which is produced on the beam by the monitored force is a combined function of the magnitude of the force and its beam lever arm length and to the further fact that the change in the moment on the beam which occurs in response to a change in the monitored force is caused, in part, by the force change and in part by the change in its lever arm length which occurs during shifting of the fulcrum to balance the beam.

Such non-linear output, while quite satisfactory or even desirable in some applications of force-balance transducers, is undesirable in other applications. For example, it has been proposed in the past to use a force-balance pressure transducer of the kind under discussion as a pressure standard or barometer in place of a mercury manometer. The many advantages which a pressure standard of the force-balance type possesses over a mercury manometer are well recognized in the art and therefore need not be repeated here. The non-linearity which exists in the conventional force-balance transducers, however, has deterred the use of such transducers as a pressure standard or barometer. The reason is that the non-linear output of the transducer must be converted in some way to a linear pressure readout. This conversion necessitates either the use of conversion tables, which are difficult and cumbersome to use, or the incorporation of correction or conversion cams or other complex, costly, and often unreliable correction means in the transducer output.

Both mercury manometers and the existing force-balance transducers of the kind under discussion have other deficiencies which detract from their desirability as pressure standards or barometers. Among these other deficiencies to which the existing instruments of this kind are variously subject are poor resolution, hysteresis, fragility, variable gain over operating range, lack of portability, and inability to drive an external load.

It is another object of this invention to provide an improved spring-type force-balance transducer of the character described which generates an output linearly related to the force or pressure being monitored without the use of cams or other complex, costly, and unreliable linearizing means and which has other desirable characteristics that adapt the transducer for use as a pressure standard or barometer.

A second aspect of the invention is concerned with certain unique arrangements of the force exerting means embodied in the present transducers, whereby other linear output functions, such as pressure ratios, and certain non-linear output functions, not heretofore readily available with existing force-balance transducers, are attained.

A further object of the invention is, therefore, to provide a force-balance transducer which can be designed to generate either a linear output function or certain novel non-linear output functions of the monitored force or forces.

A third aspect of the invention is concerned with certain counter balancing features embodied in the present transducer whereby the latter is rendered relatively insensitive to accelerations in all directions. In this way, acceleration-induced error in the transducer output is minimized and the operating characteristics of the transducers are generally optimized.

Accordingly, a further object of the invention is to provide a counter-balanced force-balance transducer of the character described which is insensitive to accelerations in all directions.

Yet a further object of the invention is to provide a force-balance transducer of the character described which possesses improved reliability and resolution, low hysteresis, increased sensitivity, relatively constant gain, is relatively simple in construction and portable, and is capable of driving an external load.

Other objects, advantages and features of the invention will become evident as the description proceeds.

Briefly, the objects of the invention are attained by providing a force-balance transducer equipped with a balance beam, a movable fulcrum therefor, and three force exerting means which act on the beam at positions therealong in such manner as to attain certain novel output functions not heretofore available.

One illustrative transducer according to the invention, for example, is designed for use as a pressure standard or barometer and generates an output which is a linear function of the pressure being monitored. The three force exerting means in this illustrative transducer comprise two substantially identical bellows which effectively act on opposite ends of the transducer beam in directions to produce moments in the same direction on the beam and a constant load spring which acts on one end of the beam in a direction to produce an opposing moment on the beam. The pressure to be monitored is delivered to the interiors of both bellows, whereby the bellows exert substantially equal forces related to the monitored pressure.

As will be explained in detail later, this unique transduced configuration generates an output which is a linear function of the monitored pressure without the use of cams or other complex, costly, and often inaccurate or unreliable linearizing means. Briefly, the linear output of this transducer results from the fact that the total moment produced on a pivoted beam by two equal forces acting on the beam at opposite sides of its fulcrum and in the same direction about the fulcrum is independent of the position of the fulcrum and remain constant, so long as the force remains constant, during movement of the fulcrum along the beam.

Accordingly, in the present illustrative transducer under consideration, the moment which is produced on the transducer beam by the monitored pressure and balanced against the moment produced by the spring force is a function of the monitored pressure only. Thus, shifting of the beam fulcrum to balance the beam varies only the moment produced by the constant spring force on the beam, thereby yielding a linear pressure readout.

According to the second aspect of the present invention, other arrangements of the three force exerting means embodied in the transducer are contemplated, whereby certain novel linear and non-linear output functions not heretofore readily available are attained.

According to the third aspect of the invention, the balance beam of the present transducer is supported and counter balanced in a unique way which renders the transducer relatively insensitive to accelerations in all directions. The operating characteristics of the transducers, such as sensitivity, accuracy, resolution, and gain, are thereby optimized.

The invention will now be described in greater detail by reference to the attached drawings, wherein.

Figure 1:
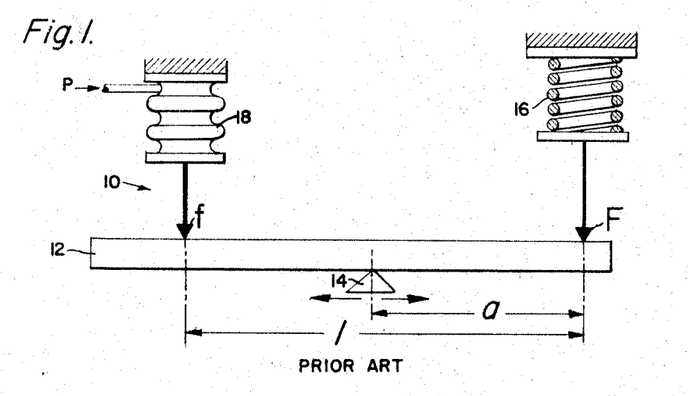
FIG. 1 diagrammatically illustrates a conventional non-linear force-balance pressure transducer.

The conventional force balance transducer 10 diagrammatically illustrated in FIG. 1 comprises a balance beam 12 supported on a movable fulcrum 14 for pivotal movement or displacement in response to the forces acting on the beam. In the case of the illustrated transducer, these forces include a constant resilient force F which is applied to one end of the balance beam 12 by a constant load spring 16 and a variable force $f$ to be monitored which is applied to the opposite end of the beam by a bellows 18 communicating with a source (not shown) of fluid pressure P to be monitored. The bellows has an effective area A.

It is evident that when the balance beam 12 is in static equilibrium, the following force balance relationship exists.

$$f(1-a) = Fa \qquad (1)$$

or $$PA(1-a) = Fa \qquad (2)$$

If we define $a$ as the output of the transducer, Equation 1 above can be rewritten as $$a = \frac{f1}{F+f} \qquad (3)$$

and Equation 2 can be rewritten as $$a = \frac{PA1}{F+PA} \qquad (4)$$

Equations 3 and 4 clearly demonstrate the non-linear relationship between the transducer output $a$ and the monitored or input force $f$ and pressure P.

Figure 2:
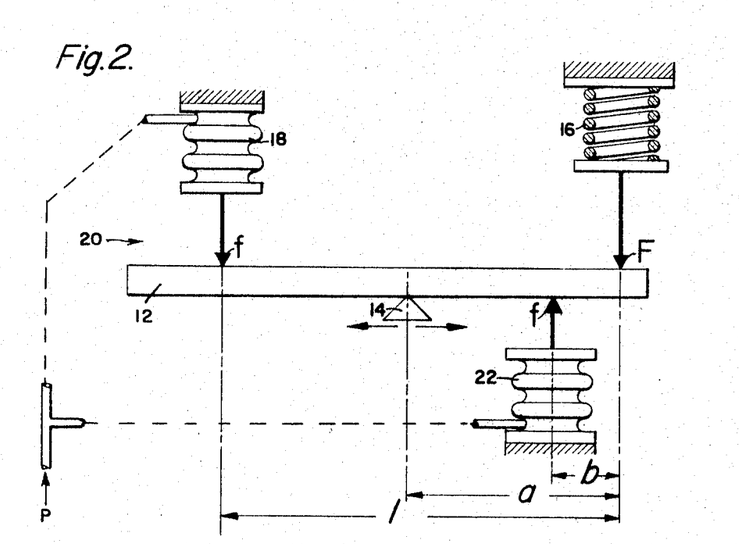
FIG. 2 diagrammatically illustrates an improved linear force-balance pressure transducer of this invention.

Reference is now made to FIG. 2 which diagrammatically illustrates the transducer of FIG. 1 improved in accordance with the primary aspect of this invention. Thus, the improved transducer 20 of FIG. 2 comprises, in addition to the balance beam 12, movable fulcrum 14, constant load spring 16, and bellows 18, a second bellows 22 which has the same effective area A as the bellows 18 and communicates with the source of fluid pressure P to be monitored. Bellows 22 thus creates a force $f$ on the beam 12 which is equal to the force $f$ exerted by the bellows 18 and aids the latter force because of the illustrated arrangement of the bellows 22. It is evident from FIG. 2 that when the balance beam 12 of transducer 20 is balanced in its neutral position shown, the following force balance relationship exists.

$$f(1-a) + f(a-b) = Fa \qquad (5)$$

or $$PA(1-a) + PA(a-b) = Fa \qquad (6)$$

If we define $a$ as the transducer output, Equation 5 can be rewritten as $$a = \frac{f(1-b)}{F} = Kf \qquad (7)$$

where K is a constant and Equation 6 can be rewritten as $$a = PA\frac{(1-b)}{F} = K_1 P \qquad (8)$$

where $K_1$ is also a constant.

Equations 7 and 8 clearly demonstrate that the output $a$ of the present improved transducer 20 is linearly related to the monitored or input force $f$ or pressure P without the use of linear conversion cams or other complex, costly and often unreliable linearizing means. In other words, the transducer 20 has a unique inherent self-linearizing action. As was noted earlier and as is evident from Equations 5–8 above, this self-linearizing action results from the fact that the moment produced on the beam by the monitored force $f$ and pressure P is independent of the position of the fulcrum 14 along the beam 12. In other words, the moment which is opposed by the constant load spring 16 is a function of the monitored force $f$ or pressure P only so that the lever arm length $a$ on which the spring acts when the beam is balanced in its neutral position shown, and hence the transducer output, are direct linear functions of the monitored force or pressure. Equations 7 and 8 also show that the output $a$ is linear regardless of the position of bellow 22 along its respective end of the balance beam 12, i.e., the right-hand end of the beam as the latter is viewed in FIG. 2. Accordingly, the bellows 22 may be located in a position which results in the optimum operating characteristics, i.e., sensitivity, resolution, etc. of the transducer.

Reference is now made to FIGS. 3–10 illustrating, a typical physical embodiment of a present transducer which incorporates the self-linearizing action discussed above, in connection with FIG. 2. The transducer 26 illustrated in FIGS. 3–10 is contained within an outer hermetic enclosure or instrument case 28 having two fluid pressure inlets 30 and 32. Inlet 30 opens to the interior of the case 28 and is adapted for communication to a source of fluid pressure to be monitored or measured. The other inlet 32 connects to the transducer bellows to be described shortly. This is adapted for a communication to a constant pressure source or, in those cases where the differential between two variable pressures is to be monitored, to the source of the second pressure to be compared with the first pressure admitted through inlet 30. If the absolute value of the pressure admitted through inlet 30 is to be monitored, inlet 32 is connected to an evacuating means. As will be seen presently, the function of the hermetic instrument case 28 can be served by dual bellows, thereby eliminating the need for the case. In this case, each of the illustrated bellows would comprise a first evacuated bellows and a second bellows, to contain the monitored pressure, acting against the respective evacuated bellows in the well known way.

Proceeding now to a description of the present transducer 26 within the instrument case, numeral 34 denotes the instrument frame. This frame is mounted on the case. Frame 34 comprises a normally upper supporting platform 36 and flanges 38 and 40 along two opposite side edges of the platform. Below the platform 36 and between the flanges 38 and 40 of the base is located the balance beam 42 of the transducer.

Beam 42 is pivotally supported on a traveling fulcrum 44 represented in the drawings as a cylindrical rod which is rotatably mounted at its ends by bearings 46 on a carriage 48. Carriage 48 has rollers or wheels or rollers 50 which ride on the upper sides of rails 52 rigidly mounted on the transducer frame 34.

The traveling fulcrum carriage 48 has a depending extension 54 which is bored and threaded to receive a rotary jackscrew 56. Jackscrew 56 is rotatably supported at one end in bearing 58 mounted on the transducer frame 38 and is disposed between and parallel to the rails 52. As will be seen shortly, the output or readout of the transducer 26 is taken from the jackscrew 56. In the illustrated transducer, this is accomplished by coupling the jackscrew to a potentiometer 60, or other electrical means for generating an electrical signal related to the angular position of the jackscrew, by reduction gearing 61. The leads 62 of this potentiometer are brought to the outside of the hermetic case 28, as shown.

Jackscrew 56 is driven in rotation by a reversible servomotor 64 (FIG. 8) mounted on the transducer frame 26. The shaft of this servomotor is drivably coupled to the jackscrew by reduction gearing 66. Thus, when the servomotor 64 is energized the fulcrum carriage 48, and the fulcrum 44 thereon, are driven in one direction or the other along the balance beam 42, depending upon the direction of rotation of the motor.

Situated above the supporting platform 36 of the transducer frame 34, over one end of the balance beam 42 is a first flexible bellows 68, the lower end of which is sealed by a plate 70 fixed to the platform. The upper end of the bellows 68 is also sealed and is secured to a plate 72 fixedly mounted on two vertical posts 74. These posts extend through and below the frame platform 36 and are rigidly attached at their lower ends to a cross bar 76. Depending from the underside of the cross bar 76 at its center is a knife edge 78. Knife edge 78 seats in a shallow V-notch machined in one end of a plate 80. This plate is slidably supported on an arm 82 for adjustment lengthwise of the latter by rotation of a rotary eccentric adjustment 84 between the other end of the plate 80 and one end of the arm 82. The opposite end of the arm 82 is pivoted on the transducer frame 34 for swinging about an axis 86 toward and away from the adjacent end of the balance beam 42.

Fixed on the underside of the pivoted arm 82 approximately midway between its ends is a knife edge 88 which seats in a V-notch in the adjacent end of the balance beam 42. The mechanism 90 comprising the plate 80, arm 82, and the knife edges 78 and 88 performs a twofold function. First, it restrains the balance beam 42 against movement in its endwise direction while permitting free pivotal movement of the beam. Secondly, it serves as an adjustable ratio arm for adjusting the effective force exerted by the bellows 68 on the balance beam.

With regard to this latter function, it will be observed that if a fluid pressure is exerted on the exterior of the bellows 68, a force, proportional to this pressure and the effective area of the bellows, is transmitted through the posts 74 and knife edge 78 to the plate 80 and then from this plate, through the arm 82 and the knife edge 88, to the balance beam 42. It is evident that when the eccentric 84 is adjusted to shift the plate 80 in one direction or other along the arm 82, the bellows knife edge 78 is also shifted along the arm. This regulates the force which is transmitted through the arm to the balance beam at any given pressure on the bellows 68 because of the change which occurs in the effective lever arm distance of the bellows force on the arm 82. The total range of this adjustment is small and is permitted by the slight lateral movement which the posts 74 can undergo by virtue of the flexibility of bellows 68. The reason for this adjustment will appear shortly.

Situated above the transducer frame platform 36 over the opposite end of the balance beam 42 is a coil spring 92. The upper end of this spring seats against the underside of an annular plate 94 located below a cross bar 96 in supporting contact with adjustable set screws 97 threaded in the bar. Cross bar 96 is rigidly affixed to the frame platform 36 by posts 98. The lower end of the spring 92 seats against the upper surface of a plate 100 to the underside of which is fixed a knife edge 102. With no pressure in the instrument case 28, spring plate 100 seats against the frame plate 36 and the beam 42 is rotated slightly in the counterclockwise direction (as the beam is viewed in FIG. 3) from its neutral position of FIG. 3. Knife edge 102 seats in a V-groove in the adjacent end of the balance beam 42, as shown.

It is evident, therefore, that the spring 92 exerts a downward force on the adjacent end of the balance beam. This force creates a counterclockwise moment on the beam (as viewed in FIGS. 3, 5 and 9) which opposes the clockwise moment created on the beam by fluid pressure acting on the outside of bellows 68.

Coaxially positioned within the spring 92 is a second flexible bellows 104. The upper end of this bellows is sealed and formed with a smooth cylindrical stem 106 which extends through and slidably supports the annular spring plate 94. The bellows stem continues above the spring plate 94 and extends slidably through a bore in the cross bar 96. The upper end of this stem is threaded to receive an adjustable stop nut 108 which seats against the upper side of the cross bar. The lower end of the bellows 104 is sealed and rigidly affixed to the lower spring plate 100.

From this description, it is evident that fluid pressure acting on the outside of the bellows 104 creates an upward force on the knife edge 102 in opposition to the downward force of the spring 92. In other words, the effective downward force exerted on the balance beam 42 by the spring-bellows combination 92, 104 is equal to the downward spring force minus the fluid pressure force on the bellows. Looked at in another way, fluid pressure acting on the outside of the two bellows 68 and 104 aid one another to create a total effective clockwise moment on the balance beam 42 in opposition to the counterclockwise moment created by the spring 92.

Figure 3:
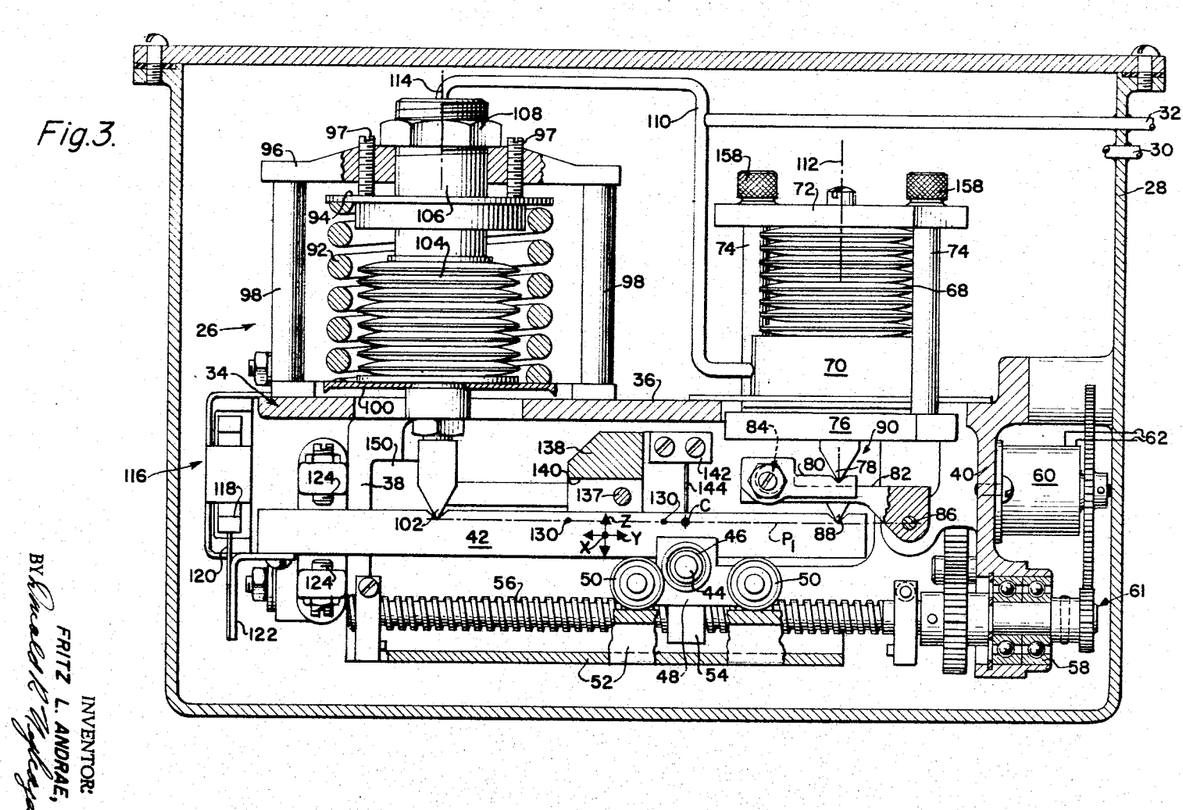
FIG. 3 is a section through a presently preferred physical embodiment of a force-balance pressure transducer which has the same inherent self-linearizing action as the transducer in FIG. 2.

For reasons which are evident from the earlier mathematical analysis of the transducer in FIG. 2 and explained later in detail, the bellows 68 and 104 must exert the same force on the balance beam 42 if the transducer output is to be linear with input or monitored pressure. Referring to FIG. 3, it will be observed that the bellows 68 and 104 are both exposed externally to the fluid pressure in the instrument case which is the pressure admitted through case inlet 30. It will be further observed that the second fluid inlet 32 on the case communicates with the interior of both bellows through a fluid line 110. When making an absolute pressure measurement, the bellows are evacuated through the line 110. When measuring or monitoring the differential between a constant pressure and a variable pressure, the constant pressure is introduced to the interiors of the bellows through inlet 32 and fluid line 110, and the variable pressure is introduced into the interior of the casing 28 on the outside of the bellows through inlet 30. Finally, when monitoring two variable pressures, one pressure is introduced to the interior of the bellows and the other pressure is introduced into the casing on the outside of the bellows.

It is obvious, therefore, that regardless of the pressures which exist at the transducer inlets 30 and 32, both bellows are subjected to the same pressure differential. Accordingly, if the bellows are to exert equal forces on the balance beam 42, as is essential to a linear transducer output, either the bellows must have exactly the same effective area or the inequality in the areas of the bellows must be compensated for. Owing to manufacturing tolerances and other factors, it is impractical, if not impossible, to obtain two bellows with precisely the same effective area. For this reason, it is necessary to provide the transducer with a means for correcting or regulating the force exerted by one bellows to make such force equal to that exerted by the other bellows at any given pressure over the design pressure range of the instrument.

In the transducer illustrated, the ratio arm system 90 affords this correction. Thus, as already explained, adjustment of the eccentric 84 embodied in this system regulates the force exerted on the balance beam 42 by bellows 68 at any given pressure differential across the bellows 68. This regulation, of course, does not alter the force which is, in effect, exerted by the bellows 104 on the beam. In this way, the forces exerted by the two bellows can be exactly equalized. The transducer also embodies certain other adjustments, to be explained later, which result in an extremely accurate, sensitive, high resolution, acceleration insensitive pressure transducer.

Mounted on the transducer frame 34 at the left-hand end of the balance beam 42, as the latter is seen in FIG. 3, are means for sensing the angular position of the beam or, more accurately, the displacement of the beam from a predetermined angular position, referred to herein as the balanced or neutral position of the beam. This is the position in which the longitudinal axis of the beam is substantially normal to the axes 112 and 114 of the bellows 68 and 104. In the drawings, this beam displacement sensing means comprises a transformer controller 116, such as a differential transformer, or "E-core." This transformer includes a movable armature 118 which is drivably connected to the adjacent end of the balance beam 42 by a flexure 120 anchored to a bracket 122 on the beam. Thus, pivotal movement of the balance beam moves the armature 118 in the transformer case. As is well known in the art, the transformer 116 generates an error signal related to the displacement of the armature from its neutral or null position. The instrument is adjusted so that the armature occupies this null position when balance beam occupies its neutral position, whereby the transformer controller 116 generates an error signal related to the angular displacement of the beam from its neutral position. The "E-core" transformer 123 is mounted on the transducer frame in the position shown.

This error signal output of the transformer is utilized to control the transducer servomotor 64, in the well known way to be explained shortly, so that the fulcrum 44 is continuously positioned to maintain the beam 42 in balance in its neutral position. Thus, when monitoring an absolute pressure, for example, the position of the fulcrum 44 along the balance beam, and hence the angular position or displacement of the jackscrew shaft 56 and the output of the potentiometer 60, are related to the monitored pressure. This relationship between the monitored pressure and the output of the potentiometer 60, which furnishes the pressure readout means of the instrument, is linear as will be evident both from the earlier discussion with reference to FIG. 2 and the description of operation of the transducer.

Mounted on the transducer frame 34 at the end of the balance beam are two limit stops 124 which limit pivotal displacement of the balance beam in each direction from its neutral position. Each of these limit stops comprises a set-screw which is rotatable to adjust the respective limiting position of the beam.

The transducer 26 is designed to operate in any position with respect to the earth's gravitational field and to be insensitive to acceleration and deceleration forces in all directions. In this way, maximum sensitivity and accuracy are attained in this transducer. In other words, maximum accuracy and sensitivity are attained, in effect, by designing the transducer so that its balance beam 42 is sensitive or responsive only to pressure induced forces and completely insensitive or unresponsive to acceleration and gravity induced forces which would obviously introduce errors into the transducer output and cause the latter to become non-linear.

To this end, the transducer is provided with the following structure in addition to that described thus far.

Figure 4:
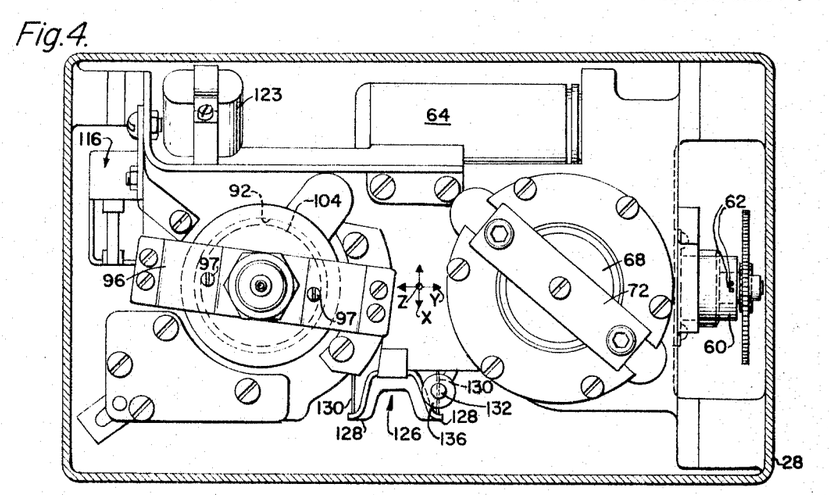
FIG. 4 is a top plan view of the transduced in FIG. 3.

The balance beam 42, when installed on a moving vehicle may obviously be subjected to acceleration forces along any one or more of the three axes, X, Y and Z in FIGS. 3 and 4. Consider first acceleration forces on the beam in the direction of the X axis. These forces tend to slide the beam along its fulcrum 44 in the endwise direction of the latter. Such movement of the beam, in the transducer thus far described, would be resisted only by the frictional forces between the beam and the fulcrum and between the beam and the knife edges 78 and 102. If the acceleration forces on the beam in the direction of the X axis were not eliminated, therefore, the beam could slide along the fulcrum under the action of such forces and become displaced with respect to, or cause cocking or other misalignment of the knife edges 78 and 102 and otherwise introduce an acceleration-induced error into the transducer output.

The balance beam 42 is supported against, and thereby rendered insensitive to, these acceleration forces which act in the direction of the X axis, as follows. Firmly attached to the side of the transducer frame 34, approximately in line with the center of gravity of the beam, is a V-shaped support 126 having legs 128. Anchored at one end to the free ends of these legs, respectively, are two wire flexures 130. The other ends of the wires 130 are anchored to the balance beam 42 at positions spaced therealong, as shown. These wire flexures are proportioned to resist acceleration forces on the beam in either direction of the X axis while permitting free pivotal movement of the balance beam on its fulcrum 44. Thus, acceleration forces along the X axis are balanced out, in effect, thereby rendering the beam insensitive to or non-responsive to such forces.

Consider now acceleration forces in the direction of the Y axis, these forces tend to move the balance beam axially. Such movement, if it occurred, would displace the beam with respect to its fulcrum 44 and thus obviously introduce error into the transducer output. Axial movement of the beam, as explained earlier, is restrained by engagement of the ratio arm fulcrum 88 in its respective V-groove in the beam. Recalling, however, that the arm 82 of the ratio arm system 90 is pivoted to the transducer frame 34 on the axis 86, it is evident that if the center of mass of the beam, the pivot axis 86 of the ratio arm 82, and the knife edges 88 and 102 are not located in a common plane normal to the bellows axes 112 and 114, when the transducer is balanced in neutral or null condition, an acceleration force in the direction of the Y axis would create a movement on the beam, thereby introducing an acceleration-induced error into the transducer output.

According to the invention, this error is eliminated by constructing the transducer with sufficient accuracy to locate the knife edges 88 and 102 and the ratio arm pivot axis 86 in a common plane $P_1$ normal to the bellows axes 112 and 114 when the beam 42 occupies its neutral or null position. Further the center of mass of the balance beam is adjustable transversely of this plane to accurately locate such mass center in the plane. To this end, the transducer illustrated is equipped with a threaded arm 132 which is fixed to a block 134 rigid on the beam and extends substantially normal to the plane $P_1$. Threaded on this arm is a counterweight 136.

Adjustment of the weight 136 obviously shifts the center of mass of the balance beam 42 along a direction line substantially normal to the plane $P_1$. Accordingly, the center of mass of the beam can be accurately located in the plane $P_1$, to eliminate error due to acceleration forces acting in the direction of the Y axis. At this point, it should be noted that the center of mass of the balance beam means the center of mass of the entire beam system including the balance beam proper and all other masses carried therby.

Consider finally acceleration forces on the beam which act in the direction of the Z axis. These acceleration forces tend to thrust the balance beam 42 against its fulcrum 44 or away from the fulcrum and against the knife edges 88 and 102. Thrusting of the beam against its fulcrum would, of course, increase the frictional forces existing in the balancing mechanism of the transducer and create other effects which would, again, introduce acceleration-induced error into the transducer output.

In the present invention, these errors are eliminated by supporting the balance beam 42 against movement or displacement under the action of acceleration forces in the direction of the Z axis. This is accomplished in the transducer 26 as follows. Pivotally mounted on the transducer frame 34, on an axis 137 parallel to the beam fulcrum 44, is a block 138 having a notch or groove 140 through which the balance beam 42 extends. The block thus straddles the beam. Rigid on this block over the center of mass of the beam, is an arm 142 to which is anchored one end of a wire flexure 144. The other end of this flexure is anchored to the beam in line with its center of mass C.

Figure 5:
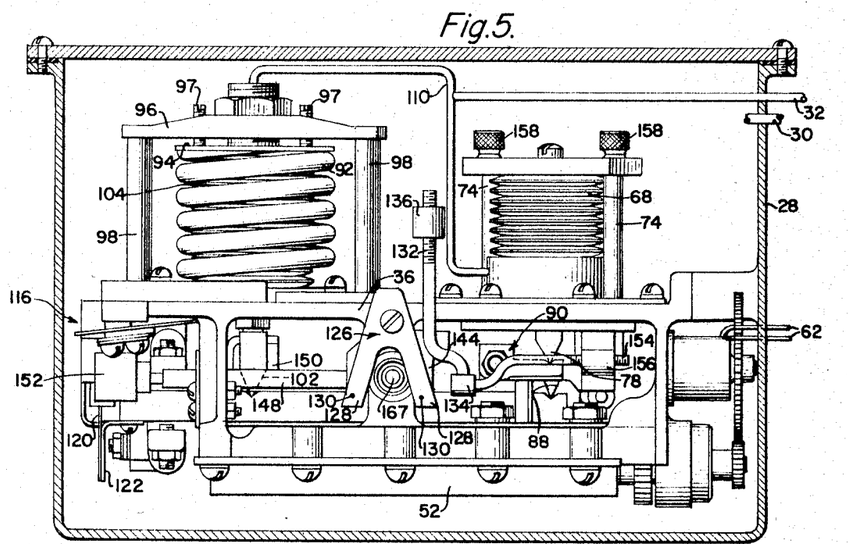
FIG. 5 is a side elevation of the transduced in FIG. 3.
Figures 6, 8:
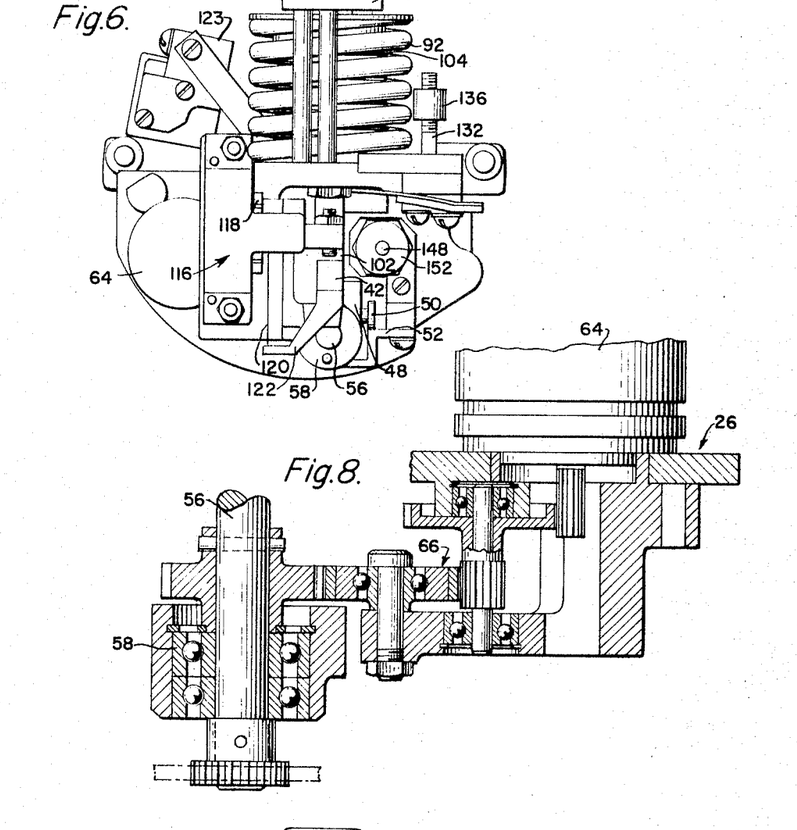
FIG. 6 is a view of the left-hand end of the transducer in FIG. 3.
FIG. 8 is an enlarged section taken in line 8—8 in FIG. 7.
Figure 7:
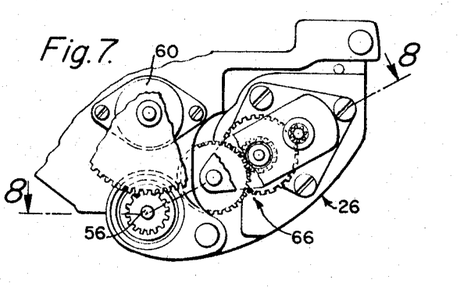
FIG. 7 is a partial left-hand end view of the transducer in FIG. 3.

Fixed to the block 138, at opposite sides of the balance beam 42, are two arms 146 and 148 which extend toward the left-hand end of the balance beam in FIGS. 3 and 5. Rigid on the free end of arm 146 is a counterweight 150. On the free end of the other arm 148 is threaded a second counterweight 152. Weight 152 is thus adjustable lengthwise of the arm 148 to vary the effective lever arm length of the weight about the pivot axis 137 of block 138.

It is evident from this description and from the drawing that acceleration forces, along the Z axis, on the balance beam 42 and on the counterweights 150 and 152 oppose one another. It should be noted at this point also that the wire flexure 144 is proportioned to withstand acceleration forces on the beam 42 and the counterweights 150 and 152 in either direction along the Z axis. It is immediately evident, therefore, that if the counterweights 150 and 152 are of the proper mass and weight 152 is properly adjusted, acceleration forces on the balance beam along the Z axis may be exactly balanced out by the counterweights, thereby eliminating any acceleration-induced error due to such accelerations.

In this latter counter balancing system for the beam 42, the weight 150 serves as a fixed gross weight and the weight 152 serves as an adjustable trim weight which can be adjusted for initial calibration as well as to compensate for any subsequent changes or adjustments of the other weights on the beam.

It is evident, of course, that the wire flexure 144 and its pivoted counterweight system permits free pivoting of the balance beam 42 on its fulcrum 44.

There remains now to consider one final source of acceleration-induced error in the transducer beam system. It is evident that if the center of mass C of the balance beam 42, i.e. the beam proper and all weights and other masses thereon, is not located directly in line with the wire flexure 144, of the counterweight system 136, 150, 152, accelerations along either the X axis or Z axis will create an unbalanced moment on the beam which will introduce an acceleration-induced error into the transducer output. For example, an acceleration along the X axis with the center of mass of the beam offset from the flexure 144 create a moment on the beam about the longitudinal axis of the wire flexure 144. This moment on the beam, however, is resisted by the wire flexures 130 which support the beam in the direction of the X axis. Nevertheless some error may be created. Similarly, accelerations along the Z axis with center of the beam mass offset create a moment on the beam about an axis normal to the wire flexure 144 and parallel to the X axis. Both of these moments would introduce acceleration-induced error into the transducer output.

According to the invention, this error is eliminated by shifting the center of mass of the balance beam 42, i.e. the entire beam system, along the beam to locate the mass center directly in line with the wire flexure 144. To this end, the transducer illustrated is equipped with a threaded arm 154 which is fixed to the block 134 on the beam and extends toward the right-hand end of the beam in FIG. 5. Threaded on this arm is a counterweight 156 which is adjustable lengthwise of the beam 42 to shift the center of mass of the beam or beam system to a position of exact alignment with the wire flexure 144.

It is evident from the preceding description that the balance beam 42 of the transducer 28 is supported and counter balanced in such a way that if the instrument is properly calibrated and adjusted, the only unbalanced forces imposed on the beam, regardless of the accelerations to which the instrument is subjected, are the forces to which the instrument is designed to be responsive, namely the fluid pressure force or forces being monitored and the force of the transducer spring 92. The balance beam system is completely insensitive to, that is the beam system is not subjected to or displaced by, any acceleration-induced forces within the accuracy permitted, of course, by the precision of manufacture and adjustment of the instrument. Accordingly, if all fluid pressure and spring forces were removed from the beam system, the latter would remain completely stationary with respect to transducer frame, and especially about the beam fulcrum 44, irrespective of the direction and/or magnitude of accelerations to which the beam system were subjected and the position of the fulcrum along the beam.

For reasons which will appear presently, a linear output or readout from the transducer 28 requires the bellows 68 and 104 to be extended to their free length when the balance beam 42 is balanced in its neutral position. To this end, the length of the bellows 68 can be adjusted by adjusting the bellows plate 72 up or down its supporting posts 74 by adjustment of the nuts 158 which are threaded on these posts to position the plate 72. The length of bellows 104 can be adjusted by adjusting nut 108 in the latter bellows.

This completes the structural description of the transducer 76. The operation of the transducer will now be explained by reference to FIGS. 9 and 10.

OPERATION

Figure 10:
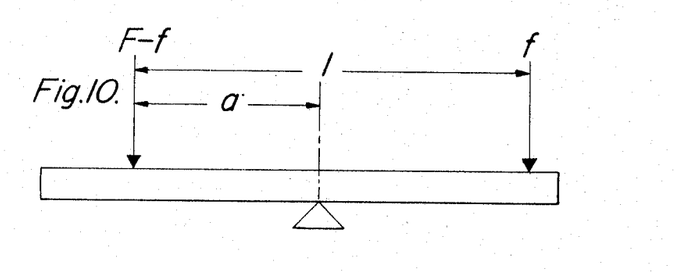
FIG. 10 is the force balance diagram for the transducer of FIGS. 3–8.

Recalling that the ratio arm system 90 is adjustable to equalize the force exerted by bellows 68 on the balance beam 42 and the force which is, in effect, exerted by the bellows 104 on the beam, it is obvious from FIG. 10 that when the beam is balanced in its neutral position, the following force balance relationship exists.

$$f(1-a) = (F-f)a \tag{9}$$

where, as before, $f$ is the force exerted by each bellows in the beam
$a$ and 1 are the lever arm distances shown, and
$F$ is the force exerted by spring 92 on the beam.

Equation 9 can be rewritten as:

$$a = \frac{f1}{F} = Kf \tag{10}$$

where $K$ is a constant. Thus, the transducer 26 represents a special case of the general transducer concept explained earlier in connection with FIG. 2 and, like the transducer of the latter figure, generates an output or readout linearly related to the absolute value of the pressure $P_2$ being monitored or to the pressure differential $P_2-P_1$ where $P_1$ is either a constant or variable pressure less than $P_2$.

Figure 9:
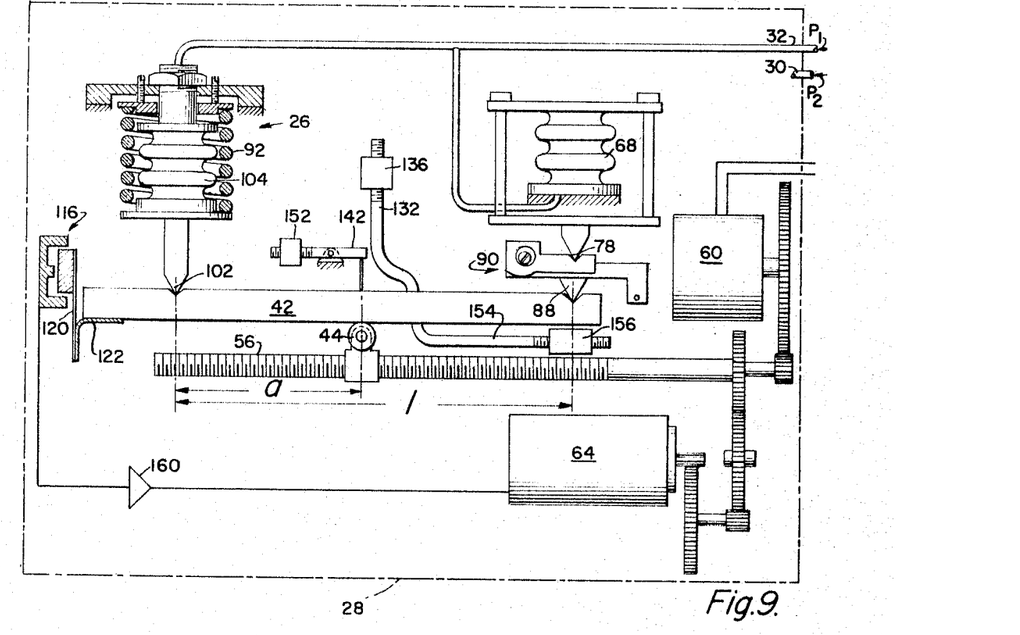
FIG. 9 diagrammatically illustrates the transducer of FIGS. 3–8.

In FIG. 9 the transformer controller, or "E-core," 116 is shown as electrically connected to the fulcrum-positioning servomotor 64 through a servo amplifier 160 which energizes the motor in response to an error signal output from the transformer 116 and in a direction to constantly maintain the balance beam 42 balanced in its neutral position. Under these conditions, the readout potentiometer 60 of the transducer generates an electrical output linearly related to the monitored pressure or pressure differential.

The readout of the instrument can be generated other than by a potentiometer. A mechanical readout could be derived directly from the jackscrew 56, for example. In the transducer illustrated, of course, this would necessitate a rotary shaft seal. This seal could be eliminated, however, by using differential bellows rather than a hermetic case to contain the monitored pressure $P_2$. Various other readout devices are, of course, also possible, such as a synchro unit.

As was noted earlier, and as is now evident, the bellows 104 need not be coaxial with the spring 92 but rather can be located at any position along its respective end of the beam. The coaxial position shown is preferred, however, since it optimizes the operating characteristics of the transducer, such as its sensitivity, resolution, hysteresis, etc.

The bellows 68 and 104 should be extended to their free length when the balance beam 42 is balanced in its neutral position. The reason for this is evident from Equation 9. Thus, if the bellows do not operate at their free length, each bellows will introduce an additional spring force into the force balance Equation 9. Since it is virtually impossible to obtain two perfectly matched bellows, the spring rates of the two bellows will generally be unequal. Referring to Equation 9, it will be seen that the inclusion of a spring force in each bellows force $f$ introduces a non-linearity into the transducer output $a$. Accordingly, if maximum linearity in the transducer output is to be obtained, the bellows must operate at their free length. As noted earlier, this is effected by manipulation of the bellows-length-adjustments explained earlier.

The present transducer can be used to measure or monitor an absolute pressure or a pressure differential. In the case of an absolute pressure measurement, the bellows 68 and 104 are evacuated through the transducer inlet 32 and the pressure $P_2$ to be monitored is supplied to the transducer through the inlet 30. The transducer, when conditioned to operate in this mode can be used as a barometer, for example, by communicating the inlet 30 to ambient atmospheric pressure. It has been found that if the instrument is properly calibrated, it has sufficient accuracy to replace a mercury manometer as a pressure standard and is, in fact, superior to a mercury manometer because of the greater sensitivity, resolution, ruggedness, and portability of the transducer as compared to a mercury manometer and because of the greater ease with which the transducer may be designed to drive an external load. The present transducer is also obviously better suited for use on moving vehicles than is a mercury manometer. The transducer, when employed to measure or monitor a pressure differential is supplied with one pressure $P_1$ through its inlet 30 and another pressure $P_2$ through its inlet 32. So long as the pressure $P_1$ is less than the pressure $P_2$, either or both pressures may be variable or constant.

Thus far, the description has been concerned with providing a linear output or readout from the transducer. If desired, however, the instrument can be designed to produce a non-linear output. Thus, referring again to FIG. 2 and to the general force balance Equation 5 for the present instrument, it is evident that if the two monitored forces $f$ in the equation are unequal, a non-linear output will result. These $f$ forces may be made unequal in the case of a pressure transducer, for example, by making the bellows of different areas. In this case, Equation 6 becomes $$PA_1(1-a) + PA_2(a-b) = Fa \tag{11}$$

which can be rewritten as $$a = \frac{P(A_1 1 - A_2 b)}{F + PA_1 - PA_2} \tag{12}$$

If $b=0$, as in the transducer of FIGS. 3–10, Equation 12 becomes $$a = \frac{PA_1 1}{F + PA_1 - PA_2} \tag{13}$$

Accordingly, either of the transducers of FIG. 2 or FIGS. 3–10 may be used to generate a non-linear output of character set forth in Equations 12 and 13 by making the bellows of different areas. Other types of non-linear operation are possible with the illustrated transducers, of course.

Figure 11:
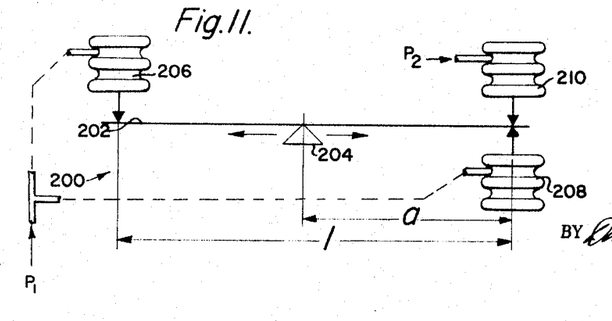
FIG. 11 diagramatically illustrates a linear force or pressure ratio transducer according to the invention.

Reference is now made to FIG. 11 which illustrates a pressure ratio transducer embodying the features of this invention. The transducer 200 shown comprises a beam 202 with a movable fulcrum 204 and three bellows 206, 208 and 210 of equal area A. One pressure $P_1$ is admitted to bellows 206 and 208 and the second pressure $P_2$ is admitted to the remaining bellows 210. When the beam 202 is balanced in its neutral position, the following force balance relation obviously exists:

$$P_1 A(1-a) + P_1 A a = P_2 A a \tag{14}$$

which can be rewritten as $$a = K \frac{P_1}{P_2} \tag{15}$$

Thus, the transducer of FIG. 11 generates an output $a/1$ which is linearly related to the ratio of the pressures being monitored. Bellows 208 and 210 obviously need not act on the beam at the same distance from the fulcrum. This transducer can also be used to generate an output function related to three different pressures admitted to the bellows 206, 208 and 210, respectively.

Clearly, then, the invention herein described and illustrated is fully capable of obtaining the objects and advantages preliminarily set forth.

While certain illustrative embodiments have been disclosed to illustrate the invention, numerous modifications in the design, arrangement of parts, and instrumentality of the invention are possible within its spirit and scope.

I claim:

1. A force-balance transducer comprising:

a frame;
a beam;
a fulcrum on said frame pivotally supporting said beam;
force exerting means including knife edges, respectively, engaging in knife edge seats in said beam and acting on said beam in directions to produce opposing moments on said beam;
means for balancing said beam;
said knife edges being disposed substantially in a common plane approximately parallel to the longitudinal axis of the beam and the pivot axis of the beam on said fulcrum;
said beam including at least one counterweight; and
means for shifting said weight along direction lines transverse to said plane to shift the center of mass of said beam into said plane.

2. The subject matter of claim 1 including:
an arm pivoted on said frame on an axis substantially parallel to said pivot axis and located substantially in said plane when said beam occupies a given neutral position about said fulcrum; and
one of said knife edges being mounted on said arm.

3. A force-balance transducer, comprising:
a frame;
a beam;
a fulcrum on said frame pivotally supporting said beam;
force exerting means acting on said beam in directions to produce opposing moments on said beam;
means for balancing said beam;
means supported on said frame and operatively connected with said beam in such manner as to accommodate free rocking motion of said beam on said fulcrum and produce a force vector on said beam opposing and substantially equal in magnitude to the force vector acting on the beam during acceleration of the transducer along direction lines transverse to the longitudinal axis of the beam;
said beam including at least one counterweight; and
means for shifting said counterweight lengthwise of said beam to shift the center of mass of the beam lengthwise of the latter to a position in which said force vectors are aligned.

4. A force-balance transducer comprising:
a frame;
a beam;
a fulcrum on said frame pivotally supporting said beam;
force exerting means including knife edges, respectively, engaging in knife edge seats in said beam and acting in directions to produce opposing moments on the beam;
means for balancing said beam;
said knife edges being disposed substantially in a common plane approximately parallel to the pivot axis of the beam on said fulcrum;
an arm pivoted on said frame at one end of said beam on an axis approximately parallel to said first mentioned pivot axis and disposed substantially in said plane when said beam occupies a given neutral position on said fulcrum;
a knife edge on said arm engaging in a knife edge seat on said beam and disposed substantially in said plane;
a second arm pivoted on said frame and having one end located approximately over the center of mass of the beam;
a flexure connecting said end of the second arm to said beam approximately in line with said center of mass;
a counterweight on the other end of said second arm proportioned to create a force vector on said beam opposing and substantially equal to the force vector created by the mass of the beam during acceleration of the transducer along direction lines transverse to said plane;
said beam including second and third counterweight;
means for shifting said second weight lengthwise of said beam to shift the center of mass of the beam lengthwise of the beam to a position in which said force vectors are aligned; and
means for shifting said third weight along direction lines transverse and said plane to locate said center of mass on said plane.

5. The subject matter of claim 4 wherein:
said force exerting means include a first bellows acting on said beam at one side of said fulcrum, means acting on said beam at the opposite side of said fulcrum for producing a substantially constant force on the beam in a direction to oppose the moment produced on the beam by said bellows, and a second bellows having an effective area substantially equal to the effective area of said first bellows acting at said opposite side of said fulcrum in a direction to aid said moment; and
said means for balancing the beam comprises means for shifting said fulcrum lengthwise of the beam.

6. In a force-balance transducer, the combination comprising:
a balance beam;
a fulcrum rockably supporting said beam intermediate its ends, whereby said beam has a first arm at one side of said fulcrum and a second arm at the opposite side of said fulcrum;
said beam being rockable on said fulcrum through a given neutral position;
a first force exerting means including abutting means abutting said beam in force transmitting relation acting on said first beam arm for producing a first effective force on said beam in one direction about said fulcrum and along a direction line approximately normal to the beam when the latter occupies said neutral position;
a second force exerting means acting on said second beam arm for producing a second substantially constant effective force on said beam in the opposite direction about said fulcrum and along a direction line approximately normal to the beam when the latter occupies said neutral position;
a third force exerting means including abutting means abutting said beam in force transmitting relation acting on said second beam arm for producing a third effective force on said beam in said one direction about said fulcrum and along a direction line approximately normal to the beam when the latter occupies said neutral position, whereby said first and third effective forces produce a combined effective moment on said beam opposing the moment produced on said beam by said second effective force;
said fulcrum being movable lengthwise of said beam to balance the beam in said neutral position; and
means associated with said first and third force exerting means for maintaining substantially equal said first and third effective forces, whereby the distance along said beam between said fulcrum and a given reference position on the beam is approximately a linear function of each of said first and third effective forces and said second effective force when said beam is balanced in said neutral position, wherein
said second force exerting means is a spring.

7. In a force balance transducer, the combination comprising:
a balance beam;
a fulcrum rockably supporting said beam intermediate its ends, whereby said beam has a first arm at one side of said fulcrum and a second arm at the opposite side of said fulcrum;
said beam being rockable on said fulcrum through a given neutral position;
a first force exerting means including abutting means abutting said beam in force transmitting relation acting on said first beam arm for producing a first effective force on said beam in one direction about said fulcrum and along a direction line approximately normal to the beam when the latter occupies said neutral position;

a second force exerting means acting on said second beam arm for producing a second effective force on said beam in the opposite direction about said fulcrum and along a direction line approximately normal to the beam when the latter occupies said neutral position;

a third force exerting means including abutting means abutting said beam in force transmitting relation acting on said second beam arm for producing a third effective force on said beam in said one direction about said fulcrum and along a direction line approximately normal to the beam when the latter occupies said neutral position, whereby said first and third effective forces produce a combined effective moment on said beam opposing the moment produced on said beam by said second effective force;

said fulcrum being movable lengthwise of said beam to balance the beam in said neutral position; and means associated with said first and third force exerting means for maintaining substantially equal said first and third effective forces, whereby the distance along said beam between said fulcrum and a given reference position on the beam is approximately a linear function of the ratio of each of said first and third effective forces and said second effective force when said beam is balanced in said neutral position; wherein said first and third force exerting means each comprise a fluid pressure responsive means to be exposed to a fluid pressure differential for producing an effective force on said beam proportional to the fluid pressure differential active on the respective fluid pressure responsive means.

8. In a force-balance transducer, the combination comprising:

a balance beam;

a fulcrum rockably supporting said beam intermediate its ends, whereby said beam has a first arm at one side of said fulcrum and a second arm at the opposite side of said fulcrum;

said beam being rockable on said fulcrum through a given neutral position;

a first fluid pressure responsive force exerting means to be exposed to a fluid pressure differential and acting on said first beam arm for producing a first effective force proportional to said fluid pressure differential on said beam in one direction about said fulcrum and along a direction line approximately normal to the beam when the latter occupies said neutral position;

a second force exerting means acting on said second beam arm for producing a second substantially constant effective force on said beam in the opposite direction about said fulcrum and along a direction line approximately normal to the beam when the latter occupies said neutral position;

a third pressure responsive force exerting means to be exposed to a fluid pressure differential and acting on said second beam arm for producing a third effective force proportional to said latter fluid pressure differential on said beam in said one direction about said fulcrum and along a direction line approximately normal to the beam when the latter occupies said neutral position, whereby said first and third effective forces produce a combined effective moment on said beam opposing the moment produced on said beam by said second effective force;

said fulcrum being movable lengthwise of said beam to balance the beam in said neutral position; and means associated with said first and third force exerting means for maintaining substantially equal said first and third effective forces, whereby the distance along said beam between said fulcrum and a given reference position on the beam is approximately a linear function of each of said first and third effective forces and said second effective force when said beam is balanced in said neutral position.

9. The subject matter of claim 8 wherein:

said first and third fluid pressure responsive force exerting means have substantially equal effective areas; and said means for maintaining said first and third effective forces substantially equal comprises means communicating said first and third force exerting means for exposing said latter means to substantially the same fluid pressure differential, whereby said distance is approximately a linear function of said latter fluid pressure differential.

10. The subject matter of claim 8 wherein said first and third fluid pressure responsive force exerting means comprise bellows, respectively, having substantially equal effective areas; and said means for maintaining said first and third effective forces substantially equal comprises means communicating said bellows for exposing the latter to substantially the same fluid pressure differential, whereby said distance is approximately a linear function of said latter pressure differential.

11. In a force-balance transducer, the combination comprising:

a balance beam;

a fulcrum rockably supporting said beam intermediate its ends, whereby said beam has a first arm at one side of said fulcrum and a second arm at the opposite side of said fulcrum;

said beam being rockable on said fulcrum through a given neutral position;

a first force exerting means including abutting means abutting said beam in force transmitting relation acting on said first beam arm for producing a first effective force on said beam in one direction about said fulcrum and along a direction line approximately normal to the beam when the latter occupies said neutral position;

a second force exerting means acting on said second beam arm for producing a second effective force on said beam in the opposite direction about said fulcrum and along a direction line approximately normal to the beam when the latter occupies said neutral position;

a third force exerting means including abutting means abutting said beam in force transmitting relation operatively connected to said second force exerting means for producing on the latter means a third effective force in direct opposition to said second effective force, thereby to diminish the magnitude of said second effective force active on said beam by an amount substantially equal to the magnitude of said third effective force, whereby said first and third effective forces produce a combined effective moment on said beam opposing the moment produced on said beam by said second effective force;

said fulcrum being movable lengthwise of said beam to balance the beam in said neutral position; and means associated with said first and third force exerting means for maintaining substantially equal said first and third effective forces, whereby the distance along said beam between said fulcrum and a given reference position on the beam is approximately a linear function of the ratio of each of said first and third effective forces and said second effective force when said beam is balanced in said neutral position; wherein said first and third force exerting means each comprise a fluid pressure responsive means to be exposed to a fluid pressure differential for producing an effective force proportional to the fluid pressure differential active on the respective fluid pressure responsive means; and said second force exerting means comprises a means for producing a substantially constant second effective force.

12. In a force balance transducer, the combination comprising:

a balance beam;

a fulcrum rockably supporting said beam intermediate its ends, whereby said beam has a first arm at one side of said fulcrum and a second arm at the opposite side of said fulcrum;

said beam being rockable on said fulcrum through a given neutral position;

a first force exerting means including abutting means abutting said beam in force transmitting relation acting on said first beam arm for producing a first effective force on said beam in one direction about said fulcrum and along a direction line approximately normal to the beam when the latter occupies said neutral position;

a second force exerting means acting on said second beam arm for producing a second effective force on said beam in the opposite direction about said fulcrum and along a direction line approximately normal to the beam when the latter occupies said neutral position;

a third force exerting means including abutting means abutting said beam in force transmitting relation acting on said second beam arm for producing a third effective force on said beam in said one direction about said fulcrum and along a direction line approximately normal to the beam when the latter occupies said neutral position, whereby said first and third effective forces produce a combined effective moment on said beam opposing the moment produced on said beam by said second effective force;

said fulcrum being movable lengthwise of said beam to balance the beam in said neutral position; and means associated with said first and third force exerting means for maintaining substantially equal said first and third effective forces, whereby the distance along said beam between said fulcrum and a given reference position on the beam is approximately a linear function of the ratio of each of said first and third effective forces and said second effective force when said beam is balanced in said neutral position; wherein each of said force exerting means comprises a fluid pressure responsive force exerting means to be exposed to a fluid pressure differential for producing an effective force proportional to the fluid pressure differential active on the respective fluid pressure responsive means;

said first and third fluid pressure responsive force exerting means having substantially equal effective areas; and said means for maintaining said first and third effective forces substantially equal comprises means communicating said first and third fluid pressure responsive force exerting means for exposing said last-mentioned means to substantially the same fluid pressure differential, whereby said distance is approximately a linear function of the ratio of the fluid pressure differential active on each of said first and third fluid pressure responsive means and the fluid pressure differential active on said second fluid pressure responsive means.

13. In a force balance transducer, the combination comprising:

a balance beam;

a fulcrum rockably supporting said beam intermediate its ends, whereby said beam has a first arm at one side of said fulcrum and a second arm at the opposite side of said fulcrum;

said beam being rockable on said fulcrum through a given neutral position;

a first force exerting means including abutting means abutting said beam in force transmitting relation acting on said first beam arm for producing a first effective force on said beam in one direction about said fulcrum and along a direction line approximately normal to the beam when the latter occupies said neutral position;

a second force exerting means acting on said second beam arm for producing a second effective force on said beam in the opposite direction about said fulcrum and along a direction line approximately normal to the beam when the latter occupies said neutral position;

a third force exerting means including abutting means abutting said beam in force transmitting relation acting on said second beam arm for producing a third effective force on said beam in said one direction about said fulcrum and along a direction line approximately normal to the beam when the latter occupies said neutral position, whereby said first and third effective forces produces a combined effective moment on said beam opposing the moment produced on said beam by said second effective force;

said fulcrum being movable lengthwise of said beam to balance the beam in said neutral position; and means associated with said first and third force exerting means for maintaining substantially equal said first and third effective forces, whereby the distance along said beam between said fulcrum and a given reference position on the beam is approximately a linear function of the ratio of each of said first and third effective forces and said second effective force when said beam is balanced in said neutral position; wherein said first and third force exerting means comprise hollow, flexible, hermetically sealed fluid pressure responsive means having substantially equal effective areas and said second force exerting means comprises a means for producing a substantially constant second effective force; and said means for maintaining said first and third effective forces substantially equal comprises a hermetic case enclosing said fluid pressure responsive means and having a first fluid inlet opening to the case interior and a second inlet, and means communicating said second inlet to the interior of each fluid pressure responsive means, whereby when said inlets are exposed to different fluid pressures, said fluid pressure responsive means are exposed to substantially the same fluid pressure differential, and said distance is approximately a linear function of said pressure differential.

References Cited by the Examiner

UNITED STATES PATENTS

| 2,729,780 | 1/1956 | Miller et al. | 73—410 X |
| 2,923,153 | 2/1960 | Westman | 73—182 |
| 2,937,528 | 5/1960 | Ketchum | 73—407 |
| 2,976,731 | 3/1961 | Westman | 73—407 |

FOREIGN PATENTS

| 575,008 | 1/1946 | Great Britain. |

LOUIS R. PRINCE, *Primary Examiner.*

JOSEPH P. STRIZAK, *Examiner.*

D. O. WOODIEL, *Assistant Examiner.*